United States Patent [19]

Eastman et al.

[11] Patent Number: 4,682,540

[45] Date of Patent: Jul. 28, 1987

[54] METHOD FOR EMOBSSING A NON-REPEATING DESIGN

[75] Inventors: Robert J. Eastman; Mark P. Tandy, both of Littleton, Colo.

[73] Assignee: Manville Corporation, Denver, Colo.

[21] Appl. No.: 873,571

[22] Filed: Jun. 12, 1986

[51] Int. Cl.⁴ .............................................. B44B 5/00
[52] U.S. Cl. ........................................ 101/32; 101/28
[58] Field of Search ................. 101/32, 211, 172, 118, 101/129, 23, 28; 68/202, 203

[56] References Cited

U.S. PATENT DOCUMENTS

| | | | |
|---|---|---|---|
| 1,985,300 | 12/1934 | Shaw | 101/32 |
| 2,318,111 | 5/1943 | Steinberger | 101/32 X |
| 2,464,301 | 3/1949 | Francis, Jr. | 101/32 X |
| 2,757,372 | 7/1956 | Chambon | 101/23 X |
| 2,943,560 | 7/1960 | Wrob et al. | 101/23 |
| 3,083,640 | 4/1963 | Milner | 101/172 |
| 3,304,862 | 2/1967 | Lawrence et al. | 68/203 X |
| 3,559,568 | 2/1971 | Stanley | 101/32 |
| 3,611,920 | 10/1971 | Timko et al. | 101/35 |
| 3,621,780 | 11/1971 | Tillotson | 68/203 X |
| 3,800,565 | 4/1974 | Worth et al. | 68/203 X |

FOREIGN PATENT DOCUMENTS

| | | | |
|---|---|---|---|
| 6433 | 2/1973 | Japan | 68/203 |
| 82461 | 5/1984 | Japan | 68/202 |

Primary Examiner—Clifford D. Crowder
Attorney, Agent, or Firm—John D. Lister; Cornelius P. Quinn; Gregory A. Evearitt

[57] ABSTRACT

Methods and apparatus' for embossing a non-repeating design on a web of material are disclosed. The methods include the steps of passing the web of material between a first pair of embossing rollers and then between a second pair of reembossing rollers. The non-repeating design may be provided by varying the rate at which the reembossing rollers are rotated and/or by providing the second pair of reembossing rollers with a diameter which is a non-rational multiple of the diameter of the first pair of rollers.

The apparatus' include means for carrying out the aforementioned methods.

A novel web product is also disclosed.

7 Claims, 5 Drawing Figures

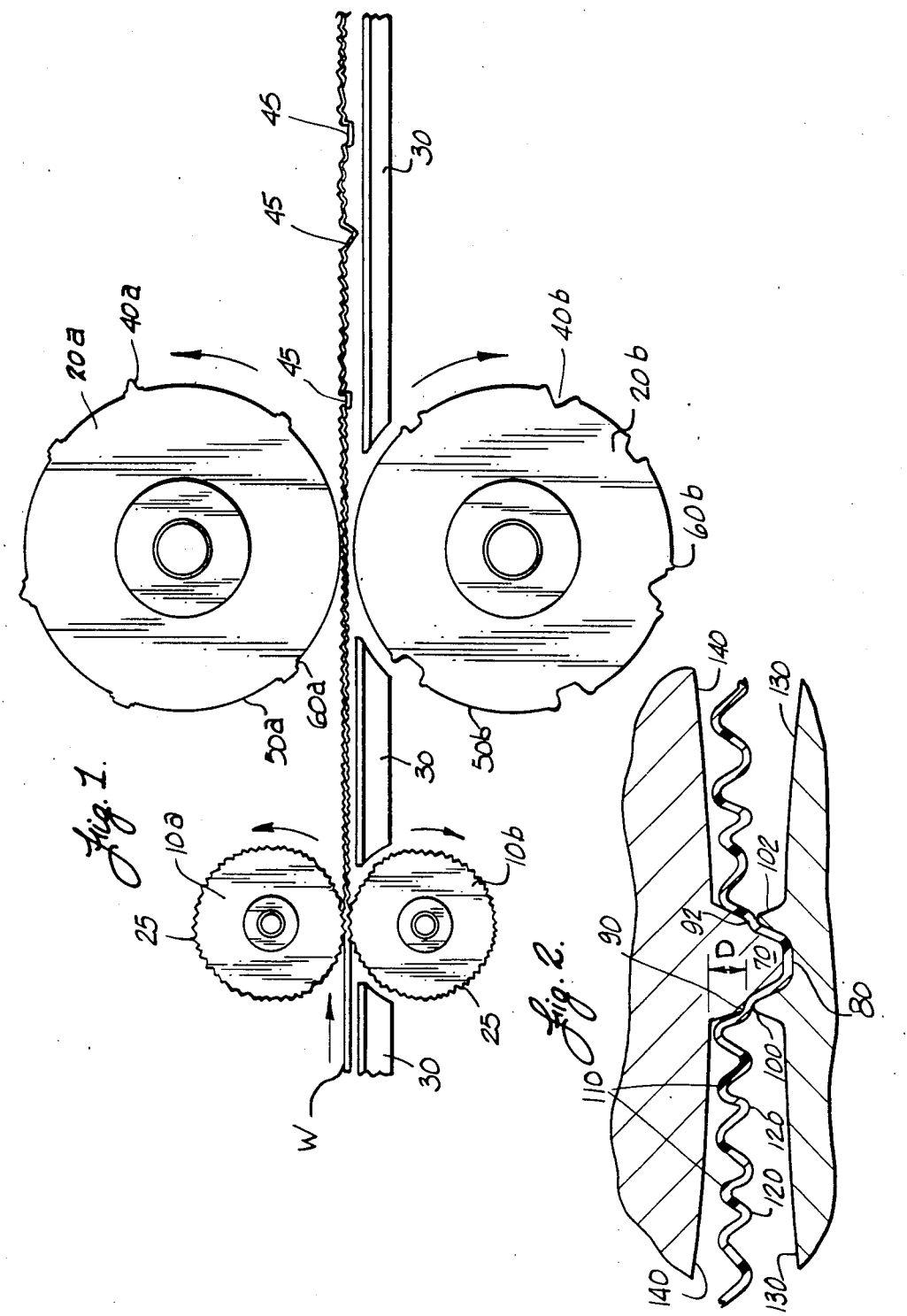

METHOD FOR EMOBSSING A NON-REPEATING DESIGN

The present invention relates to embossing or corrugating lengths of web material such as polymeric film roll roofing. More particularly, the invention pertains to a web product having a non-repeating design and a method and apparatus for producing or imprinting such a design on a length of web material.

Conventional apparatus for embossing a continuous pattern on a web of material generally comprises at least a pair of opposed embossing rollers which have an embossing pattern generally etched or machined directly into the surface of at least one roller. Rollers of this type are advantageous in that they impart a continuous embossed or corrugated pattern to the web without any breaks or interruptions. However, this method of embossing is undesirable from an aesthetic standpoint since the embossed pattern repeats with every complete rotation of the embossing rollers. While the length of one repeating section can be increased by using larger embossing rollers (i.e. rollers having larger diameters), such adds greatly to equipment and maintenance costs. Moreover, on a large susrface, such as a roof, the repeating patterns may still be visible and thus objectionable from an aesthetic standpoint.

SUMMARY OF THE INVENTION

The present invention provides a web product having a non-repeating design and a method and apparatus for producing such a non-repeating design on a web of material. The apparatus of the present invention preferably includes two pairs of opposed rollers having an embossing pattern on the surface of at least one roller of each pair. The rollers of the first pair cooperate so as to emboss a repeating pattern on a web of material as the web is passed between the rollers. The rollers of the second pair reemboss the web to interrupt the repeating design provided by the first pair of rollers. Also included is means for driving the second pair of rollers wherein rotation of the second pair of rollers is varied such that said reembossing produces the non-repeating design. Other preferred embodiments include means for heating and/or cooling the rollers.

The method of the present invention includes passing a length of web material through the aforementioned first pair of rollers to emboss a repeating pattern on the web length. The embossed web material is then passed through the aforementioned second pair of rollers to reemboss portions of the web material. Rotation of the second pair of rollers is varied such that said reembossing takes place in a manner that produces the desired non-repeating design.

The present invention also provides a novel web product having a non-repeating design.

BRIEF DESCRIPTION OF THE DRAWINGS

FIG. 1 illustrates a side elevational view of one embodiment of the present invention which includes two opposed pairs of embossing rollers receiving a web therebetween.

FIG. 2 provides a side elevational view of a typical projection and cavity of the present invention reembossing a section of web material wherein the web material is contacted at its valleys by the projection's and cavity's respective land portions.

DESCRIPTION OF PREFERRED EMBODIMENTS

Figure 3:
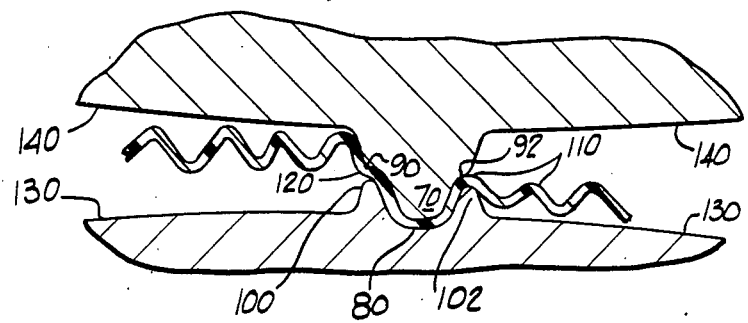
FIG. 3 provides a side elevational view of a typical projection and cavity of the present invention reembossing a section of web material in accordance with the present invention wherein the web material is contacted at a valley and a peak by the projection's and cavity's respective land portions.

FIG. 1 illustrates a first pair of embossing rollers 10a and 10b and a second pair of embossing rollers 20a and 20b of an embossing apparatus receiving a web W of material such as polymeric film roll roofing. Polymeric film roll roofing is described in allowed U.S. patent application Ser. No. 774,514, now Pat. No. 4,610,902, which is hereby incorporated by reference. Embossing rollers 10a and b are provided with a plurality of projections 25 which receive web W being conveyed on a conveyor 30 in a conventional manner whereby the projections interengage so as to deform the web material as it is passed between the rollers. The deformed web material immediately exiting rollers 10a and b is provided with a conventional embossed or corrugated pattern which repeats with every complete rotation of rollers 10a and b.

After having been embossed by rollers 10a and b, web W is, as illustrated in FIG. 1, conveyed on conveyor 30 to embossing rollers 20a and b. Rollers 20a and b are provided respectively with projections 40a and complimentary shaped cavities 40b which also interengagingly mate to deform and emboss web material W as it is passed between the rollers. In accordance with an aspect of the present invention, rollers 20a and b are provided with a diameter which is a non-rational multiple of the diameter of the embossing rollers 10a and b. The non-rational multiple diameter relationship between the two pairs of rollers is significant because it provides the second pair of rollers with the capability of reembossing portions of the web material such that the web's final design never exactly repeats itself. In effect, such reembossing randomly interrupts the repeating pattern provided by the first pair of rollers to produce the desired non-repeating design. Thus, as contemplated by the embodiment of FIG. 1, material such as polymeric film roll roofing can be embossed to simulate wood shingles or shake. In FIG. 1, projections 25 of the first pair of roller 10a and b are embossing a woodgrain effect on web W and projections 40a and cavities 40b are reembossing web W with grooves or channels 45 which simulate the gaps separating individual wood shingles.

Another important aspect of the present invention is directed to preventing the embossed repeating pattern provided by the first pair of rollers 10a and b from being damaged by the second pair of rollers 20a and b, except, of course, where reembossing by the second pair of rollers is desired. To prevent such damage, surfaces 50a and 50b, respectively, of rollers 20a and 20b (i.e. the surfaces of rollers 20a and b not defining projections 40a and cavities 40b) must be kept a predetermined distance apart which is at least equal to the thickness of the embossed web material at its thickest point after having been embossed by the first pair of rollers. This distance is not identified in FIG. 1 but is identified by the letter D in FIG. 2. If surfaces 50a and b were not maintained this distance apart surfaces 50a and b would crush or damage web W's embossed pattern as web W is passed between rollers 20a and b. In the specific embodiment illustrated in FIG. 1, surfaces 50a and b are preferably maintained a distance at least equal to 2D (more on this infra).

Another aspect of the present invention is directed to providing rollers 20a and 20b with elevated land portions 60a and b. Elevated lands are desirable in that they enable projections 40a and cavities 40b to more sharply deform the web material as it passed between the respective rollers. Accordingly, gaps 45 are more accentuated and deeper than they would be if roller 20b were not provided with lands 60a and b. Lands are also preferably slightly rounded so as to not pierce or penetrate the web material as it passed between rollers 20a and b.

Figure 4:
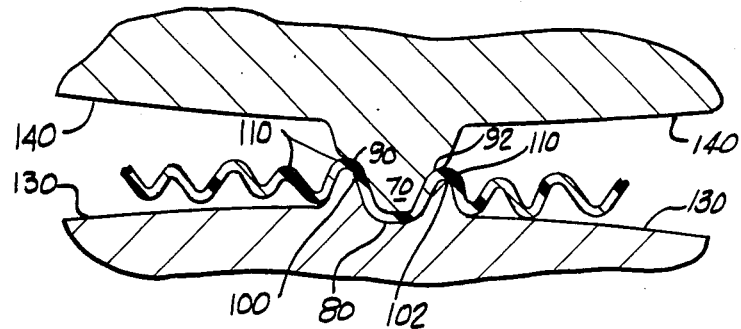
FIG. 4 provides a side elevational view of a typical projection and cavity of the present invention reembossing a section of web material wherein the web material is being contacted at its peaks by the projections and cavities respective land portions.
Figure 5:
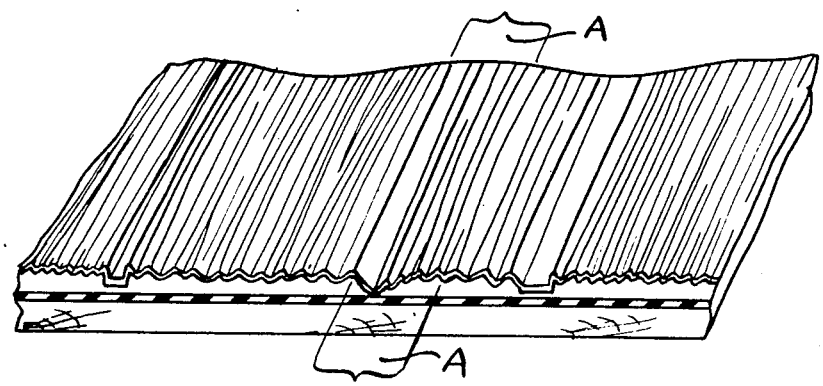
FIG. 5 provides a perspective view illustrating what a sample of web material might look like after being embossed and reembossed in accordance with the present invention and then mounted on a deck, such as a roof deck.

FIGS. 2 through 4 more graphically illustrate the accentuated embossing which is provided by the use of land portions elevated in accordance with the present invention. The projection in FIGS. 2–4 is identified by numeral 70 and the cavity by numeral 80. The leading or upstream land portion on projection 70 is identified by numeral 90 and the trailing or downstream land portion is labeled as land 92. The leading land portion on cavities 80 is identified by numeral 100 and the trailing land by numeral 102. FIG. 4 illustrates the reembossing provided when projection 70 and cavity 80 contact an embossed web W at its top or peak points (labeled herein as peaks 110). FIG. 2 illustrates the embossing provided when projection 70 and cavity 80 contact web W at its valleys or bottom points 120. As can be seen in FIG. 4, when web W is contacted at peaks 110 web W rides along or comes close to riding along a nonembossing surface 130. Concomitantly, when web W is contacted at valleys 120 as illustrated in FIG. 2, web W comes close to riding along a nonembossing surface 140. If web W is contacted at a point between a peak and valley it will, quite obviously, not ride against either surface but instead will travel along a more equidistant path between the respective surfaces. FIG. 3 illustrates another possible embossing scenario of the present invention wherein the leading lands 90 and 100 contact the web material at a valley 120 and the trailing lands 92 and 102 contact the web at a peak 110. When this happens, it can be seen from FIG. 3 that the web material travelling into the projection 70 and cavity 80 rides along or comes close to riding along nonembossing surface 140. In contrast, web material exiting projection 70 and cavity 80 rides along opposing surface 130. The resulting reembossed product will retain this offset or semi-diagonal look as illustrated in the segment of web W labeled A in FIG. 5, which illustrates what a sample of web W might look like after being embossed and reembossed in accordance with the present invention. This offset look is desirable since it further complicates and varies the design which thereby enhances the design's aesthetic appeal. The three embossments illustrated in FIGS. 2–4 are, of course, not the only embossments possible with the present invention. An infinite number of variations are possible since the lands will not always contact web W just at the peaks and valleys but also at all other points in between.

In view thereof, those skilled in the relevant art will appreciate that the present invention provides a method and apparatus for not only embossing a non-repeating design but also one that is interesting and aesthetically appealing.

To provide the reembossing discussed above, all land portions should be elevated or have a height above (or below as the case may be) their respective non-embossing surfaces 130 and 140 which is at least equal to the thickness of the embossed web material at its thickest point after having been embossed by the first pair of rollers which distance, as previously mentioned, is identified herein and in FIG. 2 as distance D. If the lands are not provided with such a height, respective surface 130 or 140 will impact and deform or distort the corrugations adjacent the portion of web W being reembossed. If the lands have a height at least equal to 1D, the peaks and/or valleys of the corrugations adjacent the reembossments may touch, or ride against the respective surfaces 130 or 140, but they will not be impacted by these surfaces such that the corrugations will be distorted or deformed.

Accordingly, those skilled in the relevant art will appreciate that by providing each land portion with the preferred height which is or equal to a greater than 1D, surfaces 130 and 140 will (as alluded to earlier) be separated by the aforementioned preferred distance of at least 2D. This will provide ample clearance for the unobstructed passage of web W between the second pair of rollers, except of course when reembossing occurs and will prevent distortion or deformation from occuring to any of the corrugations adjacent the portion of web W being reembossed.

While the aforementioned process and apparatus will emboss a novel design on web material that never theoretically repeats, from a practical standpoint the design will come close to repeating every so often. For example, if the diameter of rollers 10a and b is one foot and the diameter of rollers 20a and b is pi feet the final design produced by both rollers will come close to repeating every 69 feet. In most cases, a pattern which only repeats every 69 feet will not be discernable. However, such may be discernable on buildings with long or wide roofs.

In accordance with another aspect of the present invention, the aforementioned apparent repeat can be eliminated by randomly stopping or slowing the rotation of rollers 20a and b for varying periods of time while the rollers are in the position shown in the figure. It will be noted that while rollers 20a and b are in the illustrated position they are neither in contact nor capable of embossing or reembossing the web material. Accordingly, in this position the web W's travel on conveyor 25 will not be impeded by the stopped rollers. Such random stopping or slowing of rollers 20a and b can be provided by randomly disengaging a clutch installed between the rollers and the drive mechanism for the rollers. Random disengagement of the clutch can be provided with a random number generator which can vary the frequency and length of time the rollers are stopped. This control function can be provided with current microprocessor technology which is well known to those skilled in the relevant art. Accordingly, by employing this aspect of the present invention even apparent pattern repeats can be eliminated. It will also be appreciated that this aspect of the present invention is capable of producing a non-repeating design by itself (i.e. without employing rollers having a non-rational multiple diameter relationship.) Accordingly, if the additional expense of equipment for varying or stopping rotation of the second pair of rollers is not a problem, this aspect of the present invention can be employed with rollers of any diameter. In fact, it may even be possible to entirely dispense with the second pair of reembossing rollers. For example, reembossing could theoretically be provided with a stamp or series of stamps wherein a non-repeating design could be produced by randomly activating the stamp (or those stamps in a series of stamps) with conventional controls.

The present invention also provides for heating and cooling of the web material during embossing if the nature of the web material requires such for successful embossing or reembossing. For example, if polymeric film roll roofing material having an SBS thermoplastic modified asphalt core (such as that described in allowed patent application U.S. Pat. No. 4,610,902, is to be embossed it may be desirable prior to embossing to heat the material to a temperature where its core material melts. The heated material might then be passed through a first pair of embossing rollers which would not only emboss the web material but also chill or cool the material. Such cooling would solidify the material's molten core, thereby setting material such that it retains its embossed or corrugated shape. Such cooling can be provided by chilling or cooling the first pair of rollers with conventional means known to those skilled in the relevant art. To reemboss the now chilled embossed material with a pair of second rollers such as rollers 20a and b of FIG. 1, it may be necessary to heat the second pair of rollers. Such heating can also be provided with conventional means known to those skilled in the relevant art. The now heated reembossed material may also require cooling to set the reembossments. Such cooling can also be conventionally provided with means such as air and/or water sprays (not shown).

While specific embodiments of the invention have been shown and described in detail to illustrate application of the invention's principles, it will be understood that the invention may be embodied otherwise without departing from such principles.

What is claimed is:

1. A method for producing a non-repeating design on a web of material, said method comprising:
   providing a first and second pair of opposed rollers, each pair having an embossing pattern on the surface of at least one roller,
   passing the web of material between the first pair of rollers and then between the second pair of rollers, the first pair of rollers embossing a repeating pattern on the web and the second pair of rollers reembossing portions of the web; and
   varying the speed of rotation of the second pair's embossing rollers while maintaining the speed of rotation of the first pair's embossing rollers constant such that said repeating pattern is interrupted and said non-repeating design is produced.

2. A method according to claim 1 wherein the step of varying is conducted randomly.

3. A method according to claim 1 further comprising the step of heating the web prior to passing it between the first pair of rollers.

4. A method according to claim 3 further comprising cooling the first pair of rollers to set or solidify the embossments or corrugations provided by passing the web material between the first pair of rollers.

5. A method according to claim 4 further comprising heating the second pair of rollers to facilitate reembossing of the web material.

6. A method according to claim 5 further comprising cooling the reembossed material to set or solidify the reembossments provided by the passing the web material between the second pair of rollers.

7. A method according to claim 1 wherein the non-repeating character of the design being produced is further enhanced by dimensioning the rollers such that the diameter of the embossing roller(s) of the second pair is a non-rational multiple of the diameter of the embossing roller(s) of the first pair.

* * * * *